United States Patent
Allender et al.

(10) Patent No.: US 11,561,173 B2
(45) Date of Patent: Jan. 24, 2023

(54) MAGNETO-OPTICAL METHOD AND APPARATUS FOR DETECTING ANALYTES IN A LIQUID

(71) Applicant: COTTON MOUTON DIAGNOSTICS LIMITED, South Glamorgan (GB)

(72) Inventors: Chris Allender, Cardiff (GB); Jenna Bowen, Pontypool (GB); Stefan Eppler, Aulendorf (DE); Raphael Matelon, Cardiff (GB); James Thurlow, Anglesey (GB)

(73) Assignee: COTTON MOUTON DIAGNOSTICS LIMITED, South Glamorgan (GB)

( * ) Notice: Subject to any disclaimer, the term of this patent is extended or adjusted under 35 U.S.C. 154(b) by 0 days.

(21) Appl. No.: 16/651,934

(22) PCT Filed: Sep. 28, 2018

(86) PCT No.: PCT/GB2018/052788
§ 371 (c)(1),
(2) Date: Mar. 27, 2020

(87) PCT Pub. No.: WO2019/064024
PCT Pub. Date: Apr. 4, 2019

(65) Prior Publication Data
US 2020/0309695 A1    Oct. 1, 2020

(30) Foreign Application Priority Data

Sep. 29, 2017 (GB) .................................. 1715872
May 11, 2018 (GB) .................................. 1807651

(51) Int. Cl.
*G01N 21/59* (2006.01)
*G01N 11/10* (2006.01)
(Continued)

(52) U.S. Cl.
CPC ............. *G01N 21/59* (2013.01); *G01N 11/10* (2013.01); *G01N 11/14* (2013.01);
(Continued)

(58) Field of Classification Search
CPC ......... G01N 35/0098; G01N 33/54326; G01N 33/5433; G01N 33/5434; G01N 27/72;
(Continued)

(56) References Cited

U.S. PATENT DOCUMENTS 3,353,097 A    11/1967  Johnson
3,995,936 A    12/1976  Hepner et al.
(Continued)

FOREIGN PATENT DOCUMENTS

CA    2840903    1/2012
CA    2941635    9/2015
(Continued)

OTHER PUBLICATIONS

PCT/GB2018/052788 International Search Report and Written Opinion, dated Jan. 9, 2019.
(Continued)

*Primary Examiner* — Gordon J Stock, Jr.
(74) *Attorney, Agent, or Firm* — Quarles & Brady LLP

(57) ABSTRACT

There is provided a method of detecting a change of a state of a liquid comprising the steps of: •providing a liquid detection medium (12) comprising a liquid and having a plurality of anisotropic magnetic particles suspended therein; •applying a modulated magnetic field across at least a portion of the liquid detection medium (12), wherein the magnetic field induces an alignment of the magnetic particles; •introducing electromagnetic radiation (22) into the liquid detection medium (12); •detecting a variable which is modulated by the applied magnetic field, wherein the variable is associated with the interaction of the electromagnetic
(Continued)

radiation (22) with the magnetic particles and wherein the change in the state of the liquid causes a variation in the detected variable; and •correlating the variation in the detected variable with the change in the state of the liquid.

16 Claims, 7 Drawing Sheets

(51) Int. Cl.
G01N 21/17 (2006.01)
G01N 21/21 (2006.01)
G01N 11/14 (2006.01)
G01N 21/27 (2006.01)
G01N 11/00 (2006.01)
G01N 21/64 (2006.01)

(52) U.S. Cl.
CPC ......... *G01N 21/1717* (2013.01); *G01N 21/21* (2013.01); *G01N 21/272* (2013.01); *G01N 21/64* (2013.01); *G01N 2011/0086* (2013.01); *G01N 2011/147* (2013.01); *G01N 2021/1727* (2013.01); *G01N 2021/218* (2013.01)

(58) Field of Classification Search
CPC ................ G01N 27/74; G01N 27/745; G01N 2203/0092; G01N 11/02; G01N 11/10; G01N 11/12; G01N 11/14; G01N 11/142; G01N 11/16; G01N 11/162; G01N 11/165; G01N 2011/006; G01N 2011/008; G01N 2011/0086; G01N 2011/145; G01N 2011/1471; G01N 21/1717; G01N 21/21; G01N 21/272; G01N 21/64; G01N 21/59; G01N 21/94; G01N 2021/1721; G01N 2021/1723; G01N 2021/1725; G01N 2021/1727; G01N 2021/218
See application file for complete search history.

(56) References Cited

U.S. PATENT DOCUMENTS

| | | | | |
|---|---|---|---|---|
| 4,725,140 | A * | 2/1988 | Musha | G01N 21/21 |
| | | | | 356/336 |
| 4,812,767 | A | 3/1989 | Taketomi | |
| 8,638,435 | B2 * | 1/2014 | Strong | G01N 15/0205 |
| | | | | 356/337 |
| 2004/0175696 | A1 | 9/2004 | Ullman et al. | |
| 2007/0114181 | A1 | 5/2007 | Li et al. | |
| 2008/0191828 | A1 | 8/2008 | Gruner et al. | |
| 2008/0220411 | A1 * | 9/2008 | McNaughton | G01N 33/54326 |
| | | | | 435/5 |
| 2009/0033935 | A1 | 2/2009 | Chung et al. | |
| 2009/0033936 | A1 * | 2/2009 | Otani | G01N 21/23 |
| | | | | 356/364 |
| 2010/0105026 | A1 * | 4/2010 | Bruckl | B82Y 15/00 |
| | | | | 435/5 |
| 2012/0132534 | A1 | 5/2012 | Das | |
| 2012/0181171 | A1 | 7/2012 | Wang et al. | |
| 2012/0208296 | A1 * | 8/2012 | Ranzoni | G01N 33/54366 |
| | | | | 436/501 |
| 2014/0057366 | A1 * | 2/2014 | Dittmer | G01N 27/745 |
| | | | | 436/501 |
| 2014/0145715 | A1 | 5/2014 | Rikken et al. | |
| 2014/0302619 | A1 * | 10/2014 | Schleipen | G01N 21/6452 |
| | | | | 436/501 |
| 2015/0014560 | A1 | 1/2015 | Mayr et al. | |
| 2015/0119285 | A1 | 4/2015 | Hong et al. | |
| 2015/0125873 | A1 | 5/2015 | Newman et al. | |
| 2015/0212004 | A1 | 7/2015 | Mano | |
| 2015/0299004 | A1 | 11/2015 | Hofsajer et al. | |
| 2016/0146798 | A1 * | 5/2016 | Donolato | G01N 33/54373 |
| | | | | 506/9 |
| 2016/0153974 | A1 * | 6/2016 | Donolato | G01N 33/54313 |
| | | | | 435/7.32 |
| 2016/0356690 | A1 | 12/2016 | Amamiya et al. | |
| 2016/0367668 | A1 | 12/2016 | Kircher et al. | |
| 2017/0097338 | A1 * | 4/2017 | Arnold | G01R 33/1269 |
| 2020/0232903 | A1 * | 7/2020 | Borri | G01N 15/1475 |

FOREIGN PATENT DOCUMENTS

| | | | |
|---|---|---|---|
| CN | 102911865 | 2/2014 | |
| EP | 0872736 | 10/1998 | |
| EP | 3020824 A1 * | 5/2016 | ....... G01N 33/54386 |
| EP | 3037826 | 9/2017 | |
| FR | 2285628 | 12/1976 | |
| GB | 1065830 | 4/1967 | |
| GB | 1180869 | 2/1970 | |
| GF | 2507705 | 5/2014 | |
| GR | 20110100260 | 11/2012 | |
| JP | S5911556 | 1/1984 | |
| JP | S5911557 | 1/1984 | |
| JP | H0329874 | 2/1991 | |
| JP | H03285189 | 12/1991 | |
| JP | H06186514 | 7/1994 | |
| JP | H09281455 | 10/1997 | |
| JP | 2003248206 | 9/2003 | |
| JP | 2002234797 | 8/2007 | |
| JP | 2012000123 | 1/2012 | |
| JP | 2009145608 | 8/2012 | |
| JP | 2016164451 | 9/2016 | |
| JP | 2016031352 | 6/2017 | |
| KR | 20080074423 | 8/2008 | |
| KR | 20160088724 | 7/2016 | |
| RU | 2386933 | 4/2010 | |
| RU | 2010145211 | 8/2012 | |
| RU | 2011113520 | 5/2013 | |
| RU | 2013106578 | 8/2014 | |
| RU | 2013106584 | 8/2014 | |
| RU | 2012141426 | 10/2014 | |
| RU | 2013140152 | 3/2015 | |
| RU | 2557890 | 7/2015 | |
| WO | 1994008221 | 4/1994 | |
| WO | 2005111596 | 11/2005 | |
| WO | 2007100334 | 9/2007 | |
| WO | 2007101993 | 9/2007 | |
| WO | 2008075285 | 6/2008 | |
| WO | 2009017830 | 2/2009 | |
| WO | WO-2009037636 A1 * | 3/2009 | ........... G01N 27/745 |
| WO | 2010011241 | 1/2010 | |
| WO | 2011021142 | 2/2011 | |
| WO | 2012027747 | 3/2012 | |
| WO | 2013030542 | 3/2013 | |
| WO | 2013030601 | 3/2013 | |
| WO | 2015184133 | 12/2015 | |
| WO | 2016153517 | 9/2016 | |
| WO | 2017040915 | 3/2017 | |
| WO | 2019064024 | 4/2019 | |

OTHER PUBLICATIONS

Search Report dated Jun. 15, 2018 in connection with Great Britain Application GB1715872.6.

Search Report dated Jun. 20, 2018 in connection with Great Britain Application GB1807651.3.

* cited by examiner

MAGNETO-OPTICAL METHOD AND APPARATUS FOR DETECTING ANALYTES IN A LIQUID

CROSS-REFERENCE TO RELATED APPLICATIONS

This application represents the national stage entry of PCT International Application No. PCT/GB2018/052788 filed on Sep. 28, 2018 and claims priority to Great Britain Patent Application 1715872.6 filed on Sep. 29, 2017 and Great Britain Patent Application 1807651.3 filed May 11, 2018. The contents of these applications are hereby incorporated by reference as if set forth in their entirety herein.

This invention relates to methods and apparatus for detection, such as the detection of an analyte or the detection of a change of a state in a liquid. In particular, this invention relates to magneto-optical methods and apparatus for detection.

The reliable and accurate detection of analytes, preferably at low concentrations, is a fundamental premise to effective and successful sensing. In bio-sensing applications, analytes frequently detected include biomolecules or biological material, such as antigens, antibodies, enzymes, bacteria, toxins, nucleic acids including DNA, and the like.

In sensing or bio-sensing applications, it is generally desirable to minimise the amounts of reagents, and the volume of sample required for an assay to provide an accurate and reliable result. It is also desirable to lower the limits of detection, and develop a method which can provide reliable and accurate measurements even at low concentrations. It is also desirable to improve the sensitivity of detection of small changes in a state of a sample, where the changes arise due to the presence of an analyte.

One exemplary and non-limiting bio-sensing application relates to the detection of endotoxin. Endotoxin is derived from Gram-negative bacteria and so wherever there is potential for bacterial growth, endotoxin is likely to be present. This is problematic in the pharmaceutical industry, where the presence of endotoxin in injectable medicines can cause harm if administered to a patient. All injectable medicines are therefore screened for endotoxin. A standard assay for detecting endotoxin comprises injecting a sample solution into a rabbit and monitoring the febrile response of the rabbit. The presence of endotoxin (i.e. a "positive" test) causes a rise in temperature. Alternative methods for detecting endotoxin are preferred.

One alternative method is known as the limulus amoebocyte lysate (LAL) assay, which uses the blood from horseshoe crabs (*Limulus polyphemus*). Blood from horseshoe crabs is highly sensitive to the presence of endotoxin, and coagulates (or clots) when endotoxin is present. It is desirable to improve the detection of this clotting process to improve the sensitivity of the LAL assay.

The LAL reagent used in the LAL assay is sourced from a stock of horseshoe crabs. It is desirable, for ethical and economical reasons, to minimise the volume of reagent required for each LAL assay. However, it is important to ensure that the LAL assay continues to provide an accurate and reliable result even when low volumes are used. It is also desirable to improve the speed at which LAL assays may be performed.

Problems described above in relation to endotoxin detection are also relevant to other sensing and bio-sensing methods and applications.

It will be appreciated that, in addition to the specific problems described above, there is a general desire and need to develop improved methods of detecting analytes, and changes in a state of a sample caused by the presence of an analyte, in particular, at low concentrations. The present invention, in at least some of its embodiments, addresses at least some of these problems, desires and needs. Additionally, the present inventors have realised that their methods and apparatus are applicable also to other forms of detection, especially the detection of changes of a state in a liquid. For example, changes that arise as a consequence of a biological, physical or chemical process may also be detected.

According to a first aspect of the invention there is provided a method of detecting a change of a state of a liquid comprising the steps of: providing a liquid detection medium comprising a liquid and having a plurality of anisotropic magnetic particles suspended therein; applying a modulated magnetic field across at least a portion of the liquid detection medium, wherein the magnetic field induces an alignment of the magnetic particles; introducing electromagnetic radiation into the liquid detection medium; detecting a variable which is modulated by the applied magnetic field, wherein the variable is associated with the interaction of the electromagnetic radiation with the magnetic particles and wherein the change in the state of the liquid causes a variation in the detected variable; and; correlating the variation in the detected variable with the change in the state of the liquid.

The magnetic particles may be geometrically anisotropic, magnetically anisotropic, optically anisotropic, or a combination thereof.

The magnitude and/or the direction of the magnetic field may be modulated. The direction of the magnetic field may be rotated.

The modulated magnetic field may give rise to a phase lag between the magnetic particles and the magnetic field, and the variation in the phase lag is correlated with the change in the state of the liquid. In general, the phase lag is a phase lag between the alignment or orientation of the magnetic particles and the direction of the magnetic field.

The variable may have an amplitude. The variation in the amplitude may be correlated with the change in the state of the liquid.

The variable may be a signal associated with electromagnetic radiation exiting the liquid detection medium.

The transmission of electromagnetic radiation through the liquid medium may be detected. Fluorescence emitted from the magnetic particles may be detected. Other light emission from the sample, such as phosphorescence or chemiluminescence may also be detected. In other embodiments, scattering of the electromagnetic radiation is detected.

Alternatively, the variable may be a thermal signal or an acoustic signal which is generated as a consequence of the interaction of the electromagnetic radiation with the magnetic particles.

The variable may be enhanced by the generation of localised plasmons on the magnetic particles. The magnetic particles may comprise a coating, in which instance the variable may be enhanced by the generation of localised plasmons on the coating.

The electromagnetic radiation may be polarised. The electromagnetic radiation may be in the range 400 to 2500 nm.

An analyte may be detected by detecting the change of state of the liquid. In these embodiments, the method comprises the step of introducing a sample which contains the analyte to the liquid detection medium, wherein the analyte causes the change in the state of the liquid which causes the variation in the detected variable, and wherein the variation in the detected variable is correlated with the presence of the analyte.

The state of the liquid detection medium that the analyte causes a change in may be viscosity. The state of the liquid detection medium that the analyte causes a change in may be one or more of: pH; concentration of ions; the presence of reaction intermediates or products generated by a reaction between the analyte and the liquid detection medium; aggregation; agglutination; temperature; polarity; buoyancy; the presence of sedimentation; and the presence of precipitation.

The analyte may be a pathogen-associated molecular pattern (PAMP), such as a pyrogen or a β-glucan. The analyte may be a pyrogen or a β-glucan. The pyrogen may be an endotoxin.

The liquid detection medium may comprise a biological reagent. The biological reagent may comprise an amoebocyte lysate. The biological reagent may comprise limulus amoebocyte lysate (LAL), tachypleus amoebocyte lysate (TAL), a LAL or TAL derivative (including recombinant systems), or a component of LAL or TAL.

The state of the liquid detection medium that the PAMP causes a change in may be viscosity, and either a variation in an amplitude of the variable is correlated with the presence of the PAMP or the modulated magnetic field gives rise to a phase lag between the magnetic particles and the magnetic field, and the variation in the phase lag is correlated with the presence of the PAMP.

The analyte may be a nucleic acid derivative. The analyte may be DNA.

The analyte may be a protein. The analyte may be an antibody.

The change of state of the liquid may be a change that arises as a consequence of a biological, physical or chemical process. The change in the state of the liquid may be a change in the viscosity of the liquid. In this way, viscosity changes may be monitored over a period of time. Changes in the viscosity of liquids such as paints and inks may be detected.

The change in the state of the liquid may be the occurrence of blood coagulation. The time taken for coagulation to occur may be derived from the detection of the occurrence of blood coagulation. Thrombin time, prothrombin time, partial thromboplastin time and/or activated clotting time may be derived.

The change of state of the liquid may be one or more of: pH; concentration of ions; aggregation; agglutination; temperature; polarity; buoyancy; the presence of sedimentation; and the presence of precipitation.

The magnetic particles may be nanoparticles.

The magnetic particles may comprise iron oxide or iron. The magnetic particles may comprise one or more of cobalt, nickel, super-paramagnetic latex, and magnetic polystyrene. Other ferromagnetic materials might be contemplated. Alloys may be used.

The magnetic particles may be coated with a noble metal. The noble metal may be gold, silver, platinum, or any alloy containing gold, silver or platinum.

The magnetic particles may comprise a heterostructure. The magnetic particles may be a composite material comprising a magnetic material and a non-magnetic material. The magnetic particles may be Janus particles.

According to a second aspect of the invention there is provided an apparatus for detecting a change of a state of a liquid comprising: a liquid detection medium comprising a liquid and having a plurality of anisotropic magnetic particles suspended therein; a magnetic field generation device for applying a modulated magnetic field across at least a portion of the liquid detection medium, wherein the magnetic field induces an alignment of the magnetic particles; an electromagnetic radiation source for introducing electromagnetic radiation into the liquid detection medium; a detector for detecting a variable which is modulated by the applied magnetic field, wherein the variable is associated with the interaction of the electromagnetic radiation with the magnetic particles and wherein the change in the state of the liquid causes a variation in the detected variable; and a correlator for correlating the variation in the detected variable with the change in the state of the liquid.

The magnetic field generation device may comprise a permanent magnet or an array of permanent magnets. The permanent magnet or array of permanent magnets may be rotated in order to modulate the magnetic field. Alternatively, the permanent magnet or array of permanent magnets may be otherwise moved, such as through a reciprocating action, in order to modulate the magnetic field.

The magnetic field generation device may comprise an electromagnet device. The magnetic field generation device may comprise a coil. The magnetic field generation device may comprise a pair of generally orthogonal coils. The magnetic field generation device may be a pair of Helmholtz coils. The magnetic field generation device may be configured to apply a rotating magnetic field across at least a portion of the liquid detection medium. The use of a pair of generally orthogonal coils, such as a pair of Helmholtz coils, is a convenient way of applying a rotating magnetic field across at least a portion of the liquid detection medium.

The electromagnetic radiation source may be a laser. The electromagnetic radiation source may be a broadband light source.

The detector may comprise at least one photodiode. The detector may be a spectrometer or spectrophotometer.

Typically, the correlator is a microprocessor or another suitable computing device which is programmed or otherwise configured to recognise the change in the state of the liquid from an indicative variation in the detected variable.

Whilst the invention has been described above, it extends to any inventive combination of the features set out above or in the following description, drawings or claims. For example, any feature described in relation with the first aspect of the invention is considered to be disclosed also in relation to the second aspect of the invention.

Embodiments of the methods and apparatus in accordance with the present invention will now be described, by way of example only, and with reference to the accompanying drawings, in which.

Figure 1:
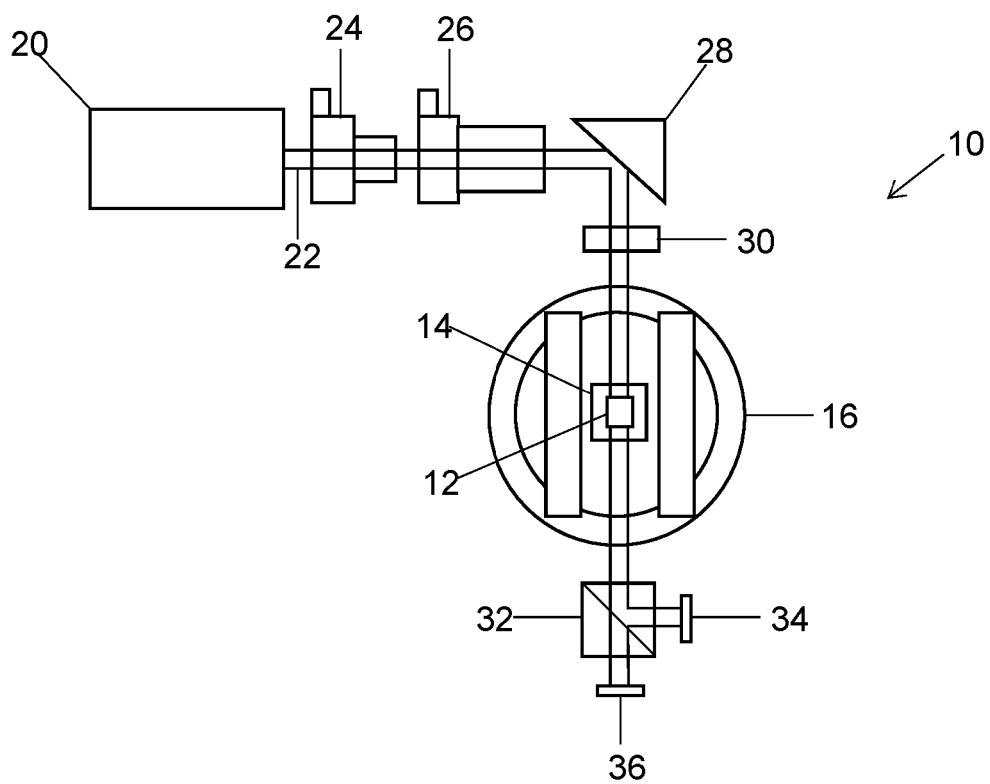
FIG. 1 is a schematic plan view of an apparatus suitable for detecting an analyte according to the invention.

FIG. 1 depicts an apparatus 10 suitable for detecting a change of state of a sample or liquid detection medium 12. The liquid detection medium 12 is contained in a cuvette, microcuvette, or other transparent container. The cuvette is held in a sample holder 14. The temperature of the sample 12 may be regulated by a thermostat (not shown). The sample holder 14 is surrounded by a pair of orthogonal Helmholtz coils 16, 18. The coils 16, 18 serve as a magnetic field generator and are powered by an external power supply (not shown).

A magnetic field is generated by applying a current to one or both of the Helmholtz coils 16, 18. The direction and magnitude of the magnetic field is varied by controlling the current flowing through each coil 16, 18. A rotating magnetic field (not shown) may be generated using known methods, for example using AC currents.

In one embodiment a laser 20 is configured to irradiate the sample 12 with light 22. The preferred wavelength of the laser light 22 is dependent upon the size and shape of the anisotropic magnetic particles, and may be between about 400 and 2500 nm. In one embodiment the sample is irradiated with a laser light having a wavelength of 658 nm. In an alternative embodiment, the wavelength is 850 nm. In one embodiment the laser light 22 is polarised by a polarising filter 24; and collimated and directed using beam shaping optics, such as a beam expander 26, mirror 28, and aperture 30.

In one embodiment, the light transmitted through the sample 12 is split, using polarising beam splitter 32, and the transmittance measured using photodiodes 34 and 36. The beam splitter 32 splits the transmitted laser beam into orthogonal vectors determined by the polarisation of the light. The photodiodes 34, 36 measure the amplitude and/or the phase of the transmitted light. The photodiodes may provide a balanced photo-detection scheme for common mode rejection and enhanced measurement sensitivity. In some embodiments, the difference in signal between the photodiodes 34, 36 is measured. In some embodiments a lock-in amplifier (not shown) is used to measure the AC response of by the photodiodes (amplitude and phase) 34, 36. Alternative parameters may be measured by the photodiodes, such as absorbance, fluorescence, phosphorescence, or chemiluminescence. The scatter of the optical signal may also be measured.

In an alternative embodiment a broadband light source is used in place of or in conjunction with the laser 20. The transmitted light may be measured using a spectrometer or spectrophotometer.

In a first embodiment of the invention the liquid detection medium 12 comprises a plurality of anisotropic magnetic particles suspended therein (not shown). In some embodiments, the magnetic particles have geometric anisotropy. In some embodiments, the magnetic particles have magnetic anisotropy. In some embodiments, the magnetic particles have optical anisotropy. Magnetic particles having combinations of these anisotropies may be used. The magnetic particles may be dispersed through the liquid detection medium 12. In one embodiment, the anisotropic magnetic particles are magnetic nanorods. In some embodiments the magnetic particles comprise one or more of iron, cobalt, nickel, super-paramagnetic latex, and magnetic polystyrene. In one embodiment the magnetic particles comprise iron oxide, iron, and/or hematite, however, the invention is not limited by the composition of the magnetic particles.

In some embodiments, the magnetic particles may be coated with gold, platinum and/or other noble metals. In some embodiments the magnetic particles are nanorods with a length of about 25-1000 nm, and a width of about 3-150 nm. Optionally, the length may be about 50-600 nm. However, the invention is not limited by the size of the magnetic particles.

When a magnetic field, generated from the Helmholtz coils 16, 18, is applied across the liquid detection medium 12, the magnetic nanorods suspended in the liquid detection medium 12 align with the direction of the magnetic field. When the magnetic particles are aligned with a magnetic field, the sample exhibits optical anisotropy, dichroism or birefringence.

Methods of the present invention comprise modulating the magnetic field applied across the liquid detection medium 12. In the first embodiment of the invention a rotating magnetic field is applied across the liquid detection medium 12. As the magnetic field rotates, the magnetic nanorods suspended in the liquid detection medium 12 also rotate to maintain their alignment with the magnetic field. In other embodiments, the amplitude of the magnetic field may be varied (with a static or rotating magnetic field).

As the magnetic nanorods rotate, the transmittance of the light irradiating the liquid detection medium 12 varies. That is, when the nanorods are fully aligned with the axis of polarisation of the optical radiation, minimum transmittance is recorded. Conversely, when the nanorods are generally orthogonal to the axis of polarisation of the optical radiation, the measured transmittance is at a maximum. The interaction between the laser light and the magnetic particles may be plasmonic or non-plasmonic. Therefore, applying an alternating magnetic field across the liquid detection medium 12 (which contains anisotropic magnetic particles) results in a modulated transmittance.

In some embodiments, the magnetic particles are coated with gold. The irradiating light may interact with gold-coated magnetic particles, which results in an enhanced light absorption. Localised plasmons may be generated on the surface of the gold-coated magnetic particles. A plasmonic interaction may lead to a greater variation in amplitude of the transmitted signal, thereby providing a more sensitive detection method. Gold-coated magnetic particles may also be bio-compatible.

In one embodiment the photodiodes 34, 36 measure the optical signal transmitted through the sample from which the amplitude and phase can be deduced when the field is modulated. In some embodiments, only the amplitude is measured. In other embodiments, phase or a combination of amplitude and phase may be measured.

The phase difference between the modulated (rotating) magnetic field and the modulated transmittance depends on the frequency of modulation of the magnetic field and the characteristics of the liquid detection medium 12, such as the viscosity and size of magnetic particle. If the rotating magnetic field is rotated at a low frequency, the rotating magnetic nanoparticles may maintain their alignment with the rotating magnetic field, and there may be little or no phase difference between the modulating magnetic field and the modulating transmittance. However, if the frequency of the rotating magnetic field is increased, drag forces acting on the rotating magnetic particles causes the rotation of the magnetic particles to be out of phase with the rotating magnetic field. Consequently, a phase lag or phase difference is observed between the modulated magnetic field and the modulated transmittance signal.

Figure 2:
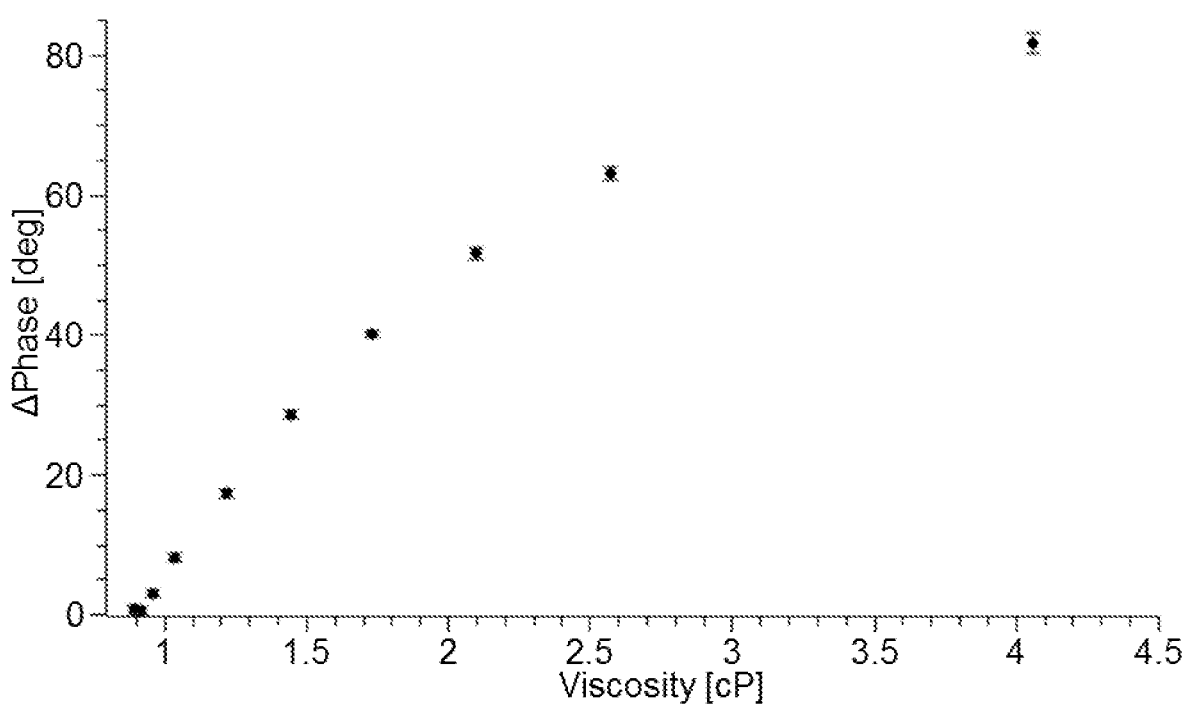
FIG. 2 is a plot of phase difference between a rotating magnetic field and the optical signal transmitted through a sample containing magnetic particles as a function of solution viscosity.

Similar effects are observed when a magnetic field rotating at a constant frequency is applied to a range of solutions of different viscosities. FIG. 2 shows how the phase difference varies across solutions having difference viscosities. The solutions were prepared by mixing pre-defined volumes of water and glycerol until the desired viscosity was reached. The magnetic particles used in this experiment comprised iron oxide nanorods, and the magnetic field was rotated at a constant frequency of about 10 Hz, and with a constant field magnitude of 50 Oe (peak value, equivalent to 3980 $Am^{-1}$). From FIG. 2, it is apparent that a small increase in viscosity from 1 cP to 1.5 cP results in a significant change in phase of ~30°.

The sensitivity of the method herein disclosed is dependent upon many parameters, such as the applied magnetic field strength, the frequency of rotation of the magnetic field, and properties of the magnetic particles. One (or more) of these parameters may be varied to optimise the sensitivity of the method at detecting changes in states of the sample 12, for example, detecting changes in samples having different concentration and/or viscosity.

A change in a state of the liquid detection medium 12 causes a change in the amplitude and/or the phase difference of the transmittance. Similarly, a change in the amplitude and/or phase difference of the transmittance is indicative of a change in a state of the liquid detection medium 12. For example, an increase in viscosity may be observed as a decrease in amplitude and/or an increase in magnitude of the phase difference of the transmittance. The present invention provides a method for detecting changes of a state of a liquid detection medium in a highly sensitive manner. In one exemplary embodiment, small changes in viscosity are detected as a significant change in amplitude and/or phase difference of transmittance.

The LAL assay is used to detect the presence of an endotoxin in a sample. The LAL assay is based on the phenomenon that the blood of horseshoe crabs coagulates (or clots) in the presence of endotoxin. That is, the viscosity of the sample increases, in some instances to form a gel, in the presence of endotoxin. The method of the present invention is suitable for detecting the change of viscosity of the LAL assay. More specifically, the present invention allows for very small changes in the viscosity to be detected, which corresponds to the detection of very low concentrations of endotoxin.

Figure 3:
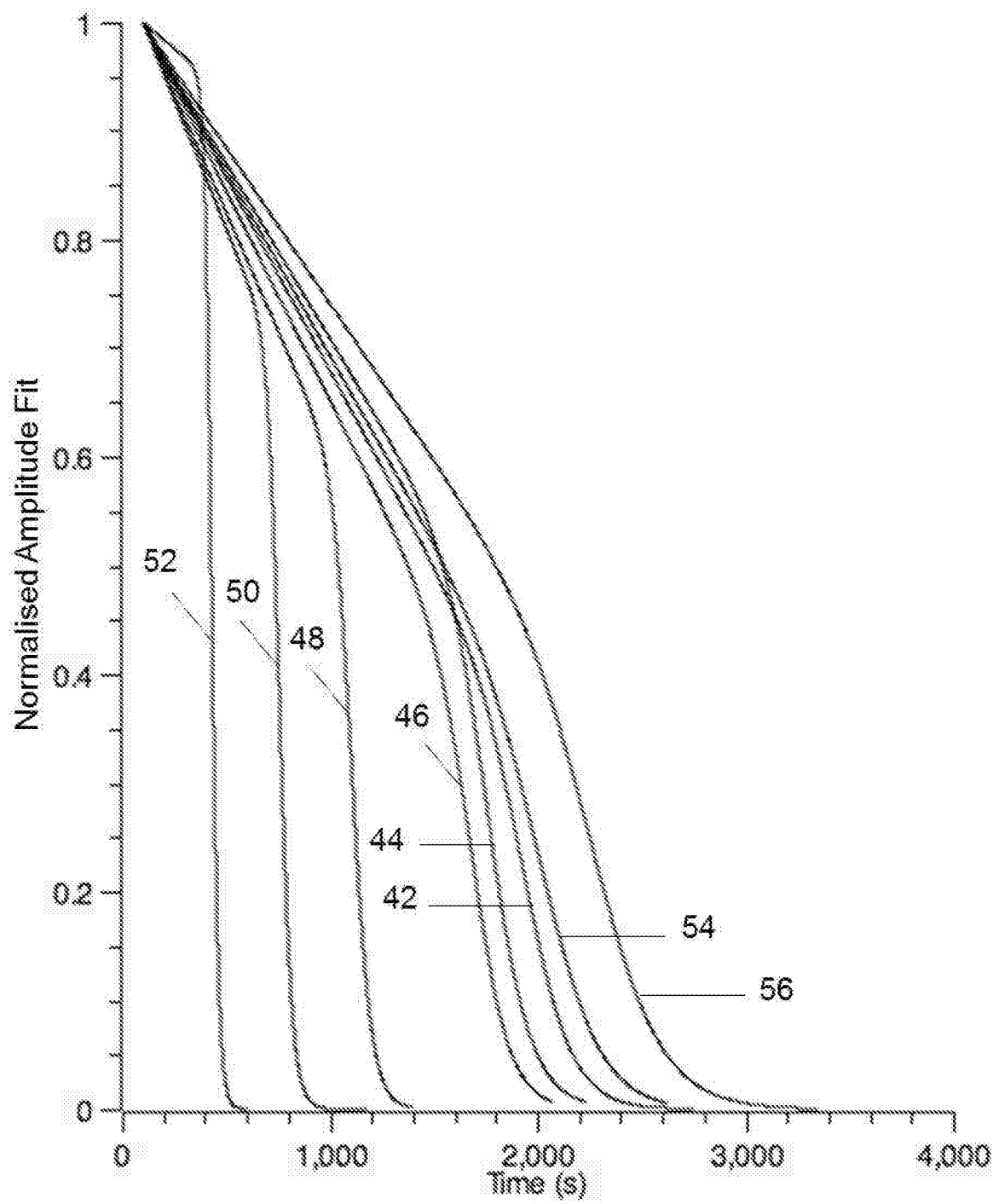
FIG. 3 is a plot of the normalized amplitude of modulated transmittance as a function of time during a LAL assay.

In one exemplary embodiment, a liquid detection medium 12 was prepared comprising at least 25 µl commercial LAL reagent, at least 10 µl magnetic nanorods, and at least 25 µl of a sample containing the analyte. In this example the analyte is endotoxin; however, the present invention is not limited by the analyte. An aliquot of the assay was transferred to a microcuvette and warmed to about 37° C. Temperature regulation is an important aspect of the invention, firstly to control the enzymatic activity, and secondly since viscosity is highly dependent upon temperature. The optimum assay temperature may be determined by the nature of the assay. The microcuvette was subsequently transferred to the sample holder 14. A rotating magnetic field with a frequency of 10 Hz was applied across the liquid detection medium 12. Laser light 22, with a wavelength of 658 nm, was used to irradiate the sample. The modulation in amplitude (and phase) of the transmittance was recorded by photodiodes 34, 36. FIG. 3 shows a plot of the normalized amplitude of the transmittance against time for a number of samples each having a different endotoxin concentration. The endotoxin concentrations tested were 0.01 EU/ml 42, 0.05 EU/ml 44, 0.1 EU/ml 46, 1 EU/ml 48, 10 EU/ml 50, and 100 EU/ml 52. The unit "EU/ml" corresponds to endotoxin units per millilitre, and is a widely used unit of concentration in the art. Control experiments were also performed with water for injections (WFI) 54 and LAL reagent water (LRW) 56.

As the coagulation reaction occurs, the viscosity of the liquid detection medium 12 increases, and in some instances may form a gel. As the viscosity increases, increased drag on the magnetic particles causes a phase difference between the rotating magnetic field and the magnetic particles. This is accompanied by a decrease in the amplitude of transmittance.

Figure 4:
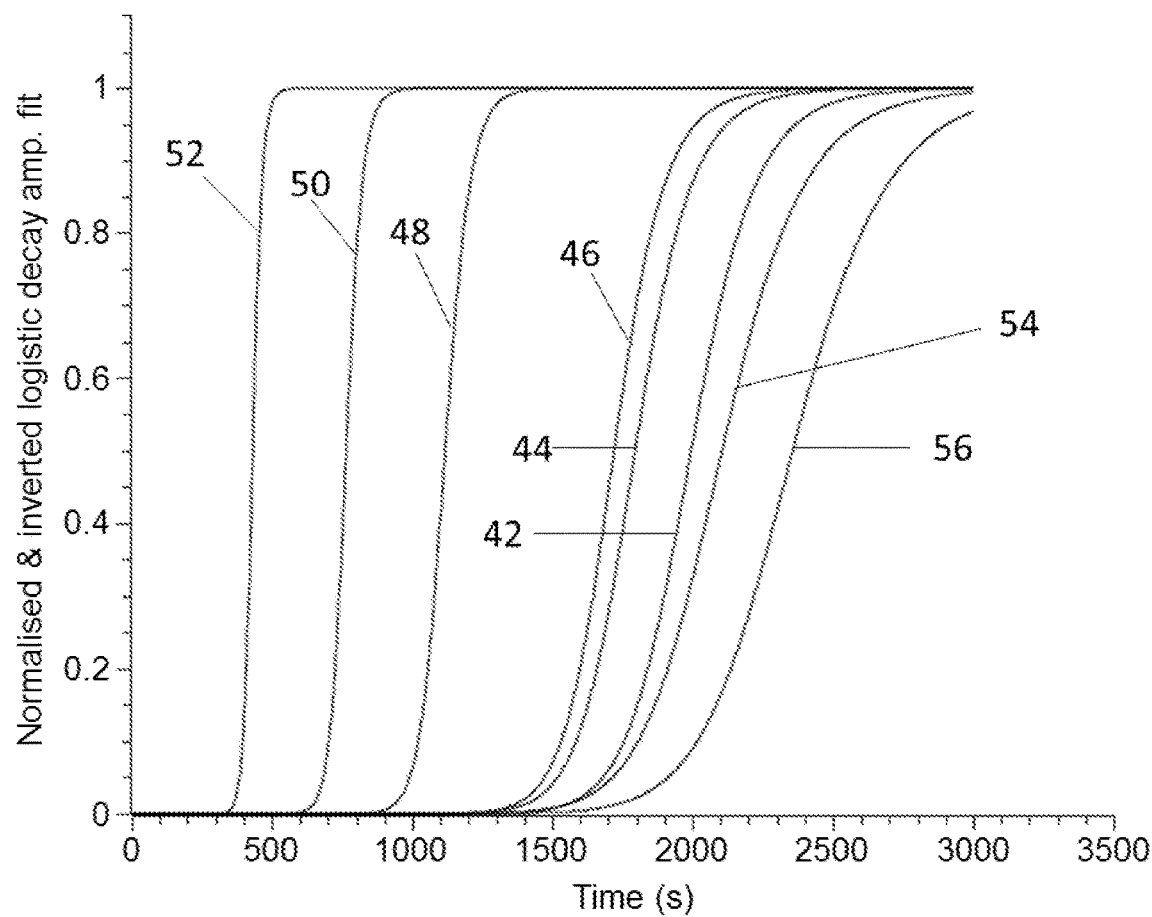
FIG. 4 is a plot of the normalized and inverted logistic decay of the amplitude of modulated transmittance as a function of time during a LAL assay.

The general profile of the curves in FIG. 3 may be described as a combination of exponential decay and a logistic function whose fitting parameter correlates with analyte concentration. The logistic function exhibits a characteristic shoulder. FIG. 4 shows a plot of the normalized and inverted logistic decay of the amplitude against time. The shoulder of FIG. 3 corresponds to the point of inflection of FIG. 4. The point of inflection may be determined using the first and second differentials of the plot. The time elapsed (from adding the analyte-containing sample to the liquid detection medium 12) prior to the exponential decay of the amplitude correlates to the concentration of analyte in the sample. That is, the coagulation reaction occurs at a faster rate at a higher analyte concentration, and hence the change in viscosity occurs sooner. For example, at an endotoxin concentration of 1 EU/ml 48, the exponential amplitude decay occurred after around 1,100 seconds, whereas at a higher concentration of 100 EU/ml 52, the exponential amplitude decay occurred after only about 400 seconds.

FIGS. 3 and 4 show that endotoxin at a concentration of 0.01 EU/ml can be detected using the method the present invention. However, the present invention is suitable for detecting endotoxin concentrations as low as 0.005 EU/ml, or even as low as 0.001 EU/ml, with careful sample preparation. The method of the invention is also suitable for using low volumes (on the order of tens of µl). This advantageously limits the amount of horseshoe crab blood required for each assay. Further, a (positive) result may be obtained on a fast timescale, for example, even a low endotoxin concentration of 0.01 EU/ml provided a result within about 30 minutes.

Figure 5:
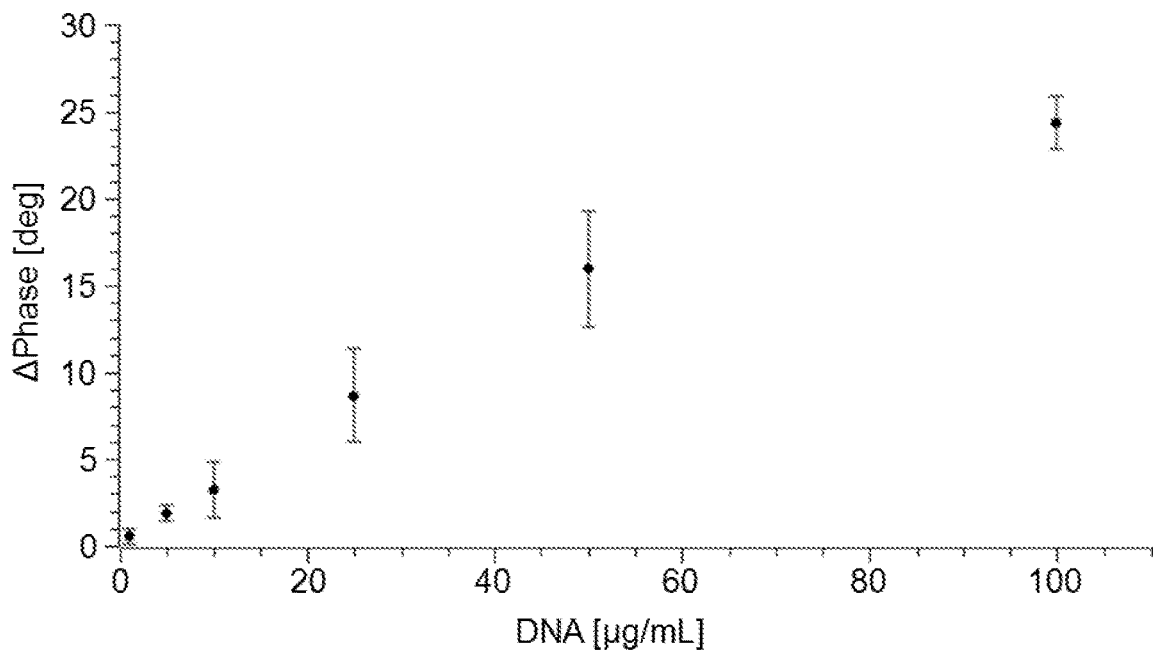
FIG. 5 is a plot showing the phase of modulated transmittance as a function of analyte concentration.

In another exemplary embodiment DNA sodium salt from calf thymus was dissolved in deionised water. Samples of the DNA solution were prepared having concentrations ranging from 1-100 µg/ml. Anisotropic magnetic particles were added to the solution, a rotating magnetic field (with constant frequency and constant field strength) was applied, and a laser light irradiated the sample (as described above). FIG. 5 shows how the measured phase of the transmittance varied at different DNA concentrations. FIG. 5 illustrates how the phase of the measured light signal (rather than the amplitude) can also be used to detect analytes at low concentrations. Changes in states of the liquid detection medium 12 are detected as a change in the phase. A change in DNA (i.e. analyte) concentration in the liquid detection medium 12 is detected as a change in phase. The concentration of analyte in the liquid detection medium may be determined using a calibration curve.

Although the present invention has been described in relation to detecting endotoxin using the limulus amoebocyte lysate (LAL) assay and DNA concentration, the invention is not limited in this regard. The methods and apparatus described above may be used to detect other analytes, such as nucleic acids including RNA and DNA; exotoxin, proteins, enzymes, blood coagulation factors, antibodies and other biomolecules and toxins. Further, other liquid detection media, such as aqueous or organic solutions may be used. The methods and apparatus described herein are preferably used to detect changes in a state of a liquid detection medium 12 which may or may not be caused by the introduction of an analyte. This change in state may be one or more of: pH; concentration of ions; the presence of reaction intermediates or products generated by a reaction between the analyte and the liquid detection medium; aggregation; agglutination; temperature; polarity; buoyancy; the presence of sedimentation; and the presence of precipitation. The change in state may occur as a result of adding the analyte to the liquid detection medium. Other exemplary tests to which the present method and apparatus may be applied include the thrombin time (TT) test, prothrombin time (PT) test, platelet activation time test or other blood coagulation factor tests. The method and apparatus disclosed herein is not limited to any particular assay.

In a second embodiment, a liquid detection medium 12 was prepared comprising a biological reagent, magnetic nanorods, and a sample containing an analyte. The analyte was a pyrogen. A pyrogen is a substance, typically produced by a bacterium, which produces fever when introduced or released into the blood. The biological reagent is typically an amoebocyte lysate, such as limulus amoebocyte lysate (LAL), tachypleus amoebocyte lysate (TAL), a LAL or TAL derivative (including recombinant systems), or a component of LAL or TAL. Recombinant systems, including recombinant proteins, have been developed to reconstruct the reaction cascade of the amoebocyte lysate reagent (Mizumura et al., *Innate Immun.*, 2017, 23(2): 136-146; and WO2012118226). In the second embodiment, the analyte is endotoxin. It is preferable to use a minimal volume of each of the biological reagent, magnetic nanorods, and the analyte-containing sample. A total volume of 1 µl to 100 µl is typical for use with the methods according to the invention. The assay was inserted into a sample loading port or sample holder 14. The sample holder is heated to a temperature of between 35 and 45° C. As mentioned above, temperature regulation is an important aspect of the invention, firstly to control the enzymatic activity, and secondly since viscosity is highly dependent upon temperature. The optimum assay temperature is generally determined by the nature of the assay.

A rotating magnetic field was applied across a portion of the liquid detection medium 12 in a similar manner to the embodiments described above. The modulation in phase of the transmittance was recorded by photodiodes 34, 36. Optionally, the amplitude is also recorded. However, the amplitude measurement is not required to correlate the phase measurement with the presence of the analyte.

Figure 6:
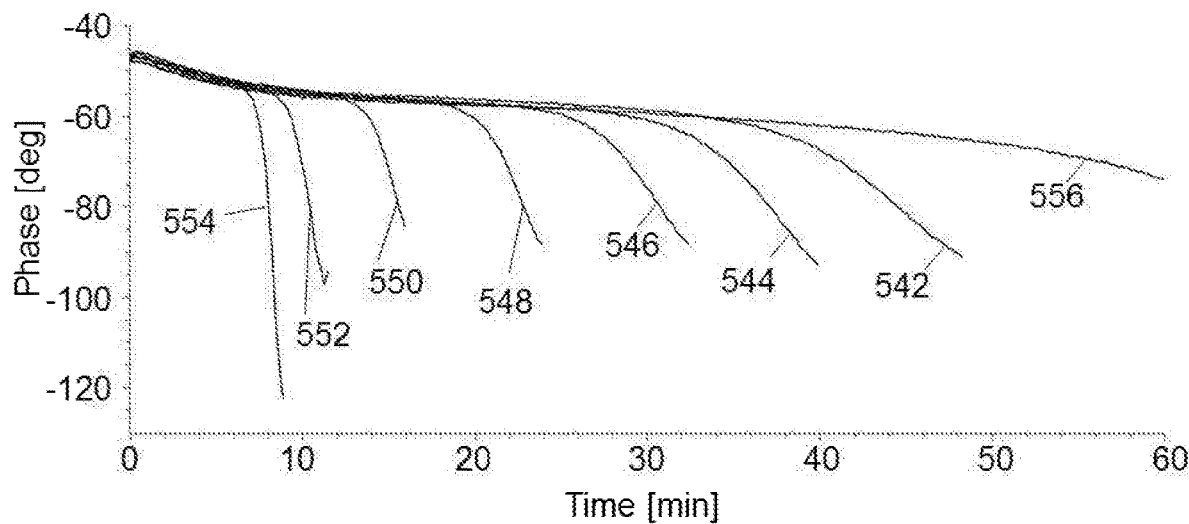
FIG. 6 is a plot showing the phase as a function of time for the second embodiment.

FIG. 6 shows a plot of phase (in degrees) against time (in minutes) for a number of samples, each sample having a different endotoxin concentration. The endotoxin concentrations tested were 0.001 EU/ml 542, 0.005 EU/ml 544, 0.01 EU/ml 546, 0.1 EU/ml 548, 1 EU/ml 550, 10 EU/ml 552, and 100 EU/ml 554, The unit "EU/ml" corresponds to endotoxin units per millilitre, and is a widely used unit of concentration in the art. Control experiments were performed with LAL reagent water (LRW) as a 'blank' 556.

As the coagulation reaction occurs, the viscosity of the liquid detection medium 12 increases. Increased drag on the magnetic particles results in a phase difference between the rotating magnetic field and the magnetic particles. This is also accompanied by a decrease in the amplitude of transmittance.

The point at which the coagulation reaction (and hence the phase difference) begins to occur may be considered as a "trigger point". More specifically, the trigger point is the time at which a sufficiently significant phase change is detected during the measurement. The trigger point can be determined using mathematical algorithms, or by any other suitable method. Using an algorithmically determined trigger point provides a consistent and more reliable approach for analysing the data.

The time that elapses between introducing the analyte to the liquid detection medium and the trigger point correlates to the concentration of the analyte in the sample. A shorter time period between introducing the analyte into the liquid detection medium and the trigger point typically correlates to a higher concentration of analyte.

By way of example only, the trigger point for a sample containing 0.1 EU/ml of endotoxin (curve 548) was reached after a period of 18 minutes, whereas the trigger point was reached more rapidly for higher concentrations (FIG. 6). The trigger point (i.e. the point at which a significant deviation in the phase occurred) was determined using a mathematical algorithm.

In a third embodiment, β-glucan was used as the analyte instead of endotoxin. Otherwise, the liquid detection medium was prepared in the same manner as for the second embodiment. The biological reagent used in the third embodiment was a LAL derivative. More specifically, a key protein involved in the clotting cascade of LAL is eliminated to form a LAL derivative having improved specificity towards β-glucan. When LAL (or LAL derivative) is used as the biological reagent, the coagulation reaction is specific to the presence of pyrogens, such as endotoxin, and β-glucan. Other microbial products do not initiate the coagulation reaction.

Figure 7:
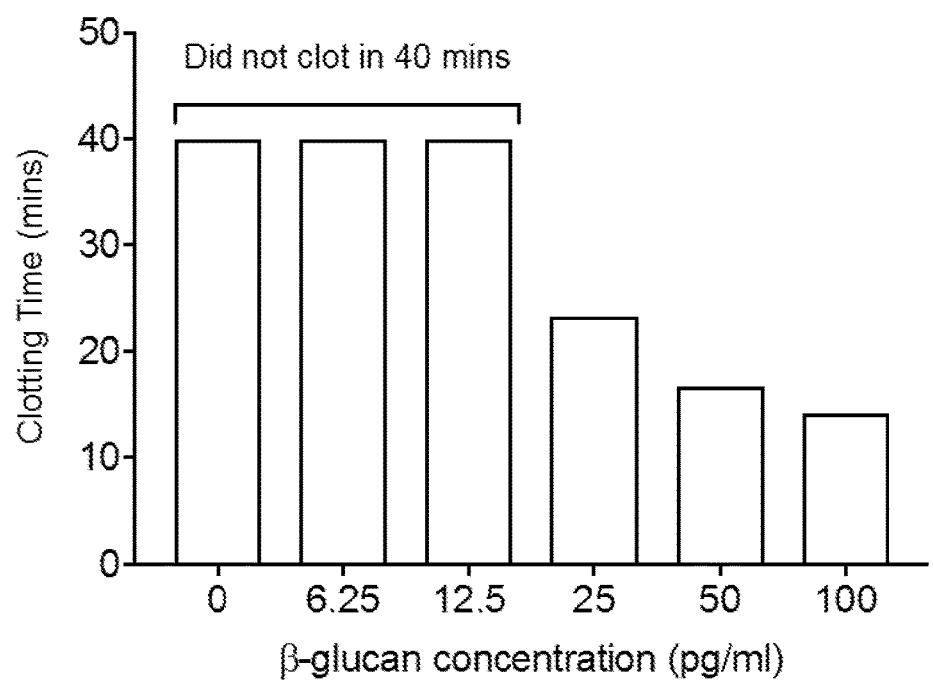
FIG. 7 is a plot showing time to reach the trigger point against analyte concentration for the third embodiment.

The sample was prepared and measurements were recorded in the same manner as described in relation to the second embodiment. The liquid detection medium of the third embodiment comprised a LAL-derivative biological reagent, magnetic nanorods, and a sample containing a β-glucan analyte. The presence of β-glucan in the liquid detection medium causes the LAL-derivative assay to initiate a coagulation reaction, whereby the viscosity of the liquid detection medium increases. The phase difference was measured as a function of time and a trigger point was determined as described above in relation to the second embodiment. FIG. 7 shows how the trigger point (in minutes) varies at different β-glucan concentrations (in picograms per millilitre, pg/ml).

In a fourth embodiment, the liquid detection medium comprises magnetic nanorods suspended in a citrated platelet-rich human blood plasma or a citrated platelet-poor human blood plasma. A venous blood sample was drawn from a human volunteer and placed into a BD Vacutainer™ sodium citrate tube (i.e. a sample tube comprising a sodium citrate solution). The venous blood sample was centrifuged at 100×g. The supernatant was removed and collected to form the citrated platelet-rich human blood plasma. The remaining blood sample was centrifuged further at 1500×g, and the resultant supernatant was removed to form the citrate platelet-poor plasma.

Figure 8:
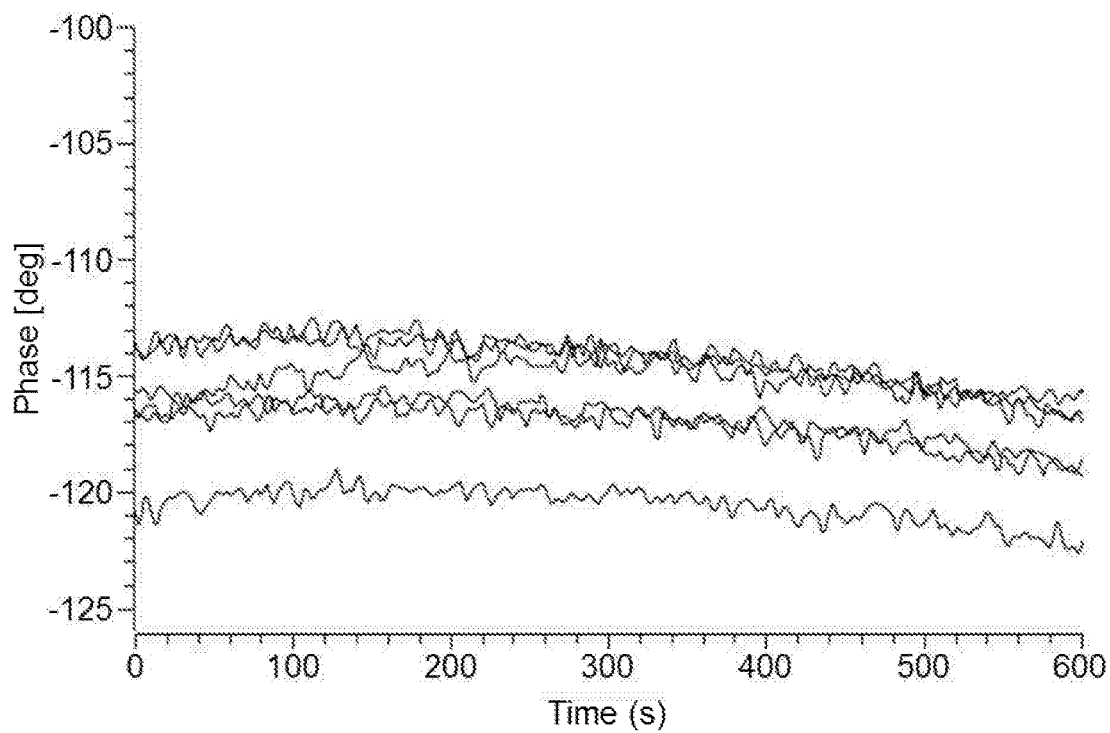
FIG. 8 is a plot showing the phase as a function of time for citrated platelet rich blood plasma.

FIG. 8 shows the magneto-optical (MO) response for a liquid detection medium comprising citrated platelet-rich human blood plasma sample with magnetic nanorods in accordance with the fourth embodiment. The data was obtained using the apparatus shown in FIG. 1. The magnetic nanorods and the citrated platelet-rich human blood plasma were independently pre-warmed to 37.5° C. prior to mixing. This temperature was maintained for the duration of the experiment. Each line in FIG. 8 corresponds to an experimental repeat (six repeats in total). No appreciable change in phase was observed after 600 s. Sodium citrate acts as an anti-coagulant, and therefore prevents the platelet-rich human blood plasma from clotting. Since the coagulation reaction is not initiated, there is no change in solution viscosity, and consequently no change in phase.

Figure 9:
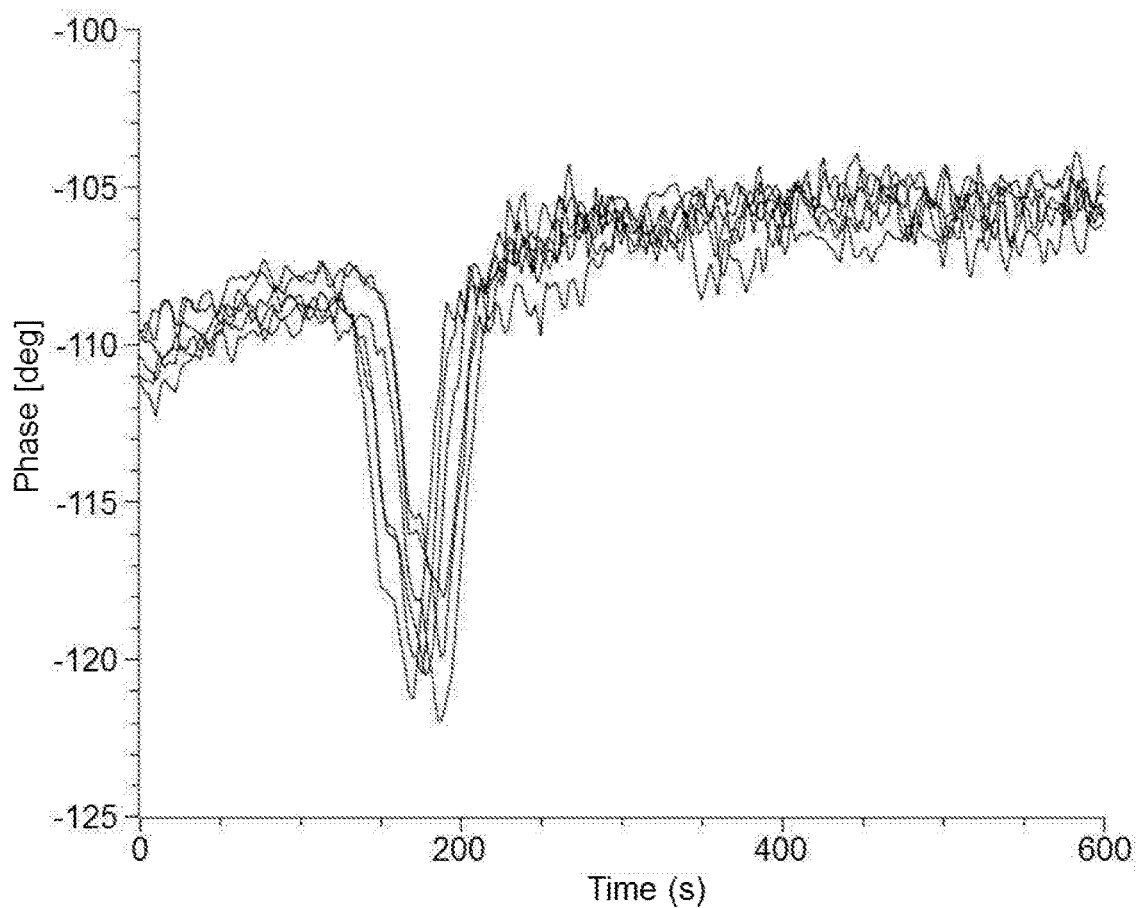
FIG. 9 is a plot showing the phase as a function of time for a coagulation reaction.

A coagulation or blood clotting reaction can be initiated by adding calcium ions (e.g. calcium chloride) to the liquid detection medium. FIG. 9 shows the magneto-optical response for a liquid detection medium comprising citrated platelet-rich human blood plasma, magnetic nanorods, and calcium chloride. The data was obtained using the apparatus shown in FIG. 1. Each component of the liquid phase medium was independently heated to 37.5° C. prior to mixing. This temperature was maintained for the duration of the experiment. Each line in FIG. 9 corresponds to an experimental repeat (six repeats in total). Re-calcification of the sample (i.e. the addition of calcium chloride) causes the blood plasma to coagulate. Without wishing to be bound by any theory or conjecture, it is believed that when the blood plasma starts to clot, fibrils start to form in solution. This brings about an overall change in the solution viscosity, which increases the drag on the magnetic particles and causes the measured phase to change accordingly. As the coagulation reaction proceeds, the fibrils precipitate from the sample and a phase separation occurs to form a clot. The clot that is formed comprises micron-sized pores. Again without wishing to be bound by any theory or conjecture, it is believed that the magnetic nanorods occupy the pores in the clot and are able to rotate freely within these pores. Since components, such as coagulation factors and proteins, have been consumed during the coagulation reaction, the local viscosity in the pores is typically less than the bulk viscosity of the blood plasma prior to the coagulation reaction commencing. Consequently, the measured phase reverts to a value similar to its starting value, and a peak is observed in the magneto-optical response. Without wishing to be bound by any theory or conjecture, it is believed that the magnetic nanorods are sensing their local 'nano-environment' rather than the bulk properties of the sample.

Figure 10:
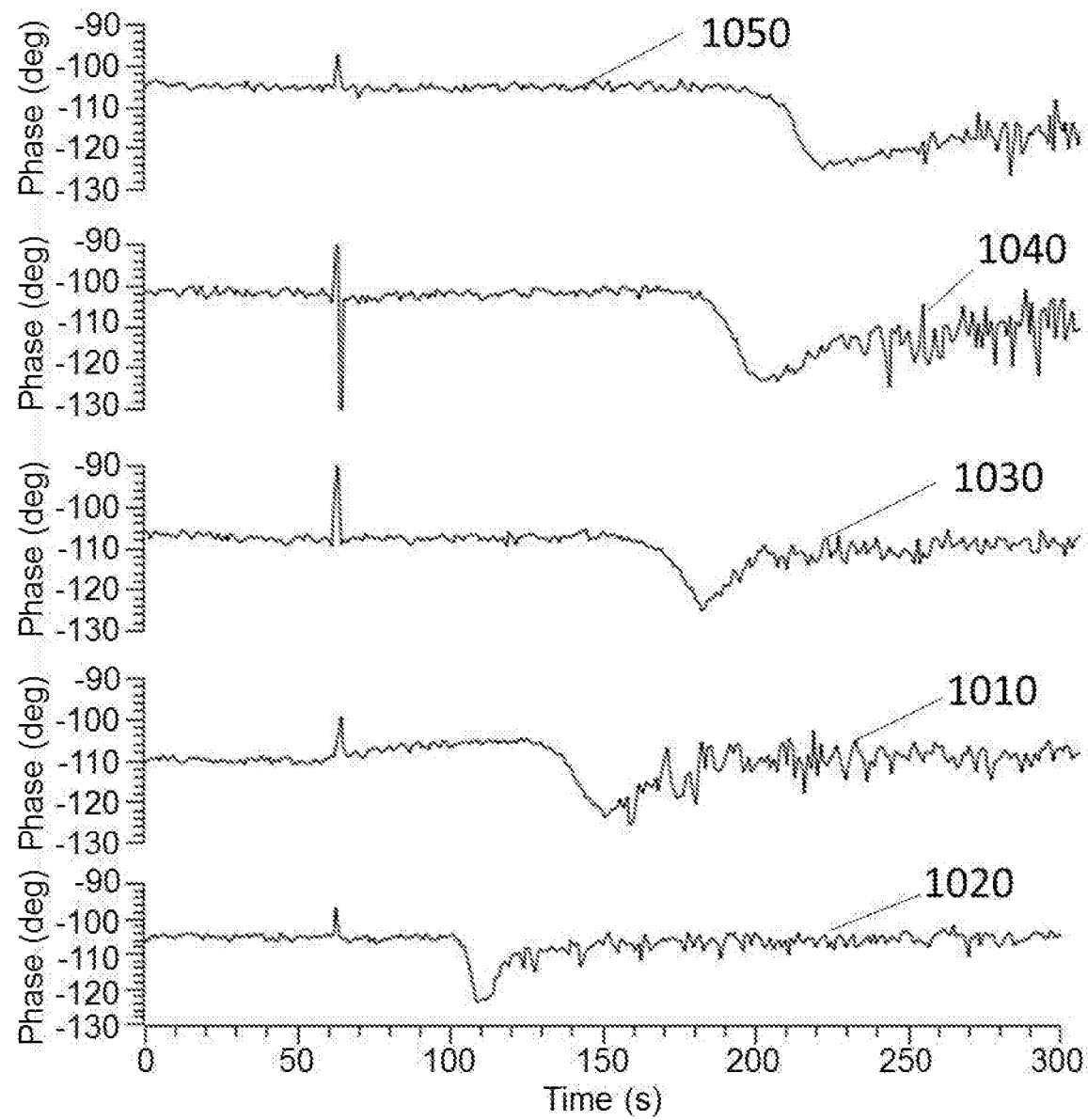
FIG. 10 is a plot showing the phase as a function of time for a coagulation reaction.

FIG. 10 shows the magneto-optical response for five different human blood plasma samples undergoing a coagulation reaction including: a platelet-rich human blood plasma (line 1010); a platelet-poor human blood plasma (line 1020); and three commercially available human blood samples for comparative purposes. Line 1030 corresponds to a commercially available human blood plasma sample with 'normal' platelet levels; and lines 1040 and 1050 correspond to commercially available human blood plasma samples with 'abnormal' platelet levels. The data was obtained using the apparatus shown in FIG. 1. Each of the liquid detection media also comprised magnetic nanorods, and a rotational thromboelastometry (ROTEM) INTEM reagent. Calcium chloride was added after 60 s to initiate the blood coagulation reaction. Each component of the liquid phase medium was independently heated to 37.5° C. prior to mixing. This temperature was maintained for the duration of the experiment.

Figure 11:
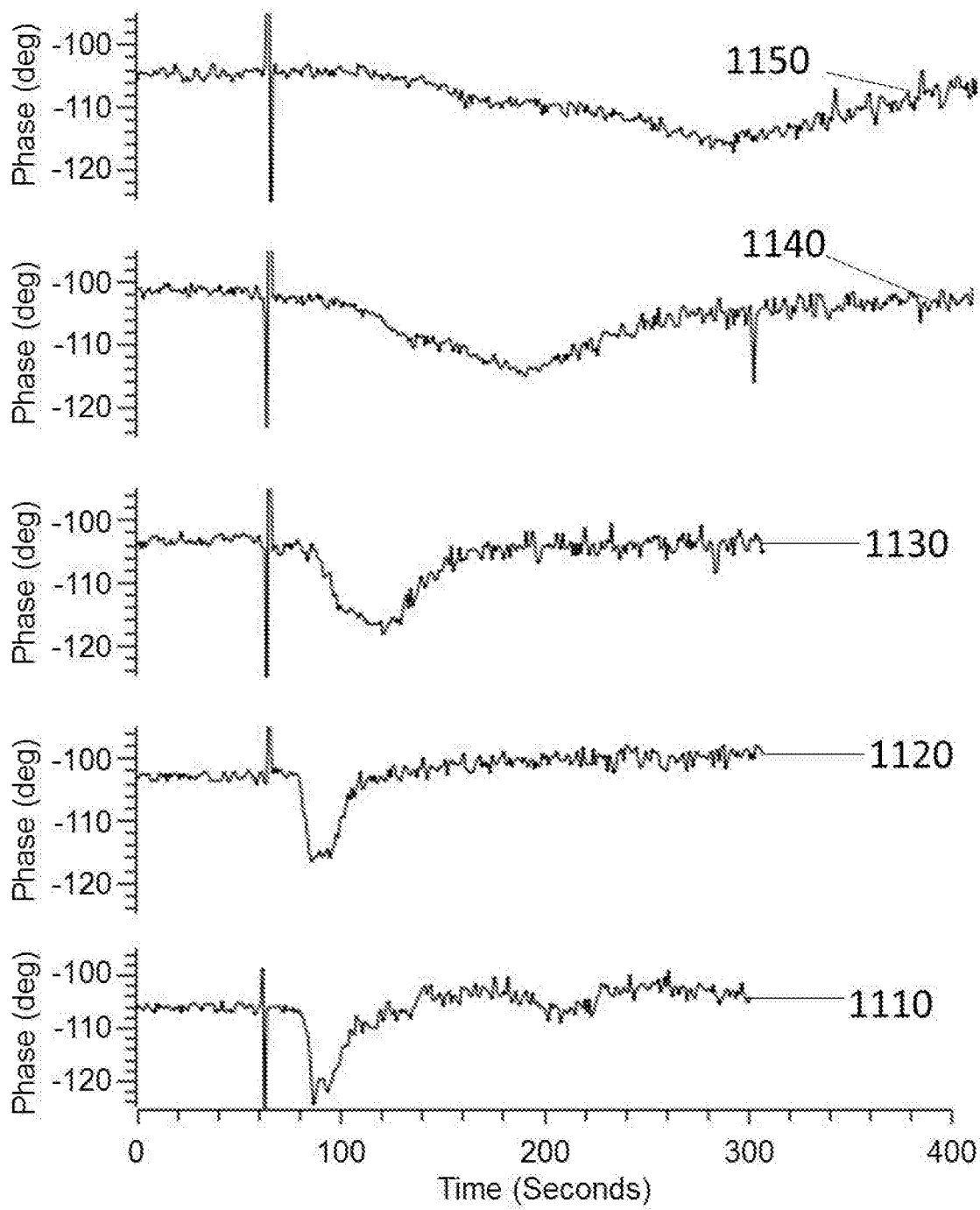
FIG. 11 is a plot showing the phase as a function of time for a coagulation reaction.

In a fifth embodiment, the liquid detection medium comprises magnetic nanorods suspended in a citrated platelet-rich human blood plasma. The citrated platelet-rich human blood plasma was prepared as described in relation to the fourth embodiment. The solution further comprises RecombiPlasTin reagent and an amount of heparin. Heparin acts as an anti-coagulant in the coagulation reaction. The addition of calcium chloride initiates the coagulation reaction, however, the rate at which the coagulation reaction occurs is dependent upon the heparin (i.e. the anti-coagulant) concentration. FIG. 11 shows the magneto-optical response for a coagulation reaction in accordance with the fifth embodiment at heparin concentrations of (i) no heparin (line 1110), (ii) 0.2 IU (line 1120); (iii) 0.3 IU (line 1130), (iv) 0.5 IU (line 1140), and (v) 0.7 IU (line 1150). The unit "IU" is the international unit. The data was obtained using the apparatus shown in FIG. 1. Calcium chloride was added at 60 s to initiate the coagulation reaction. Each component of the liquid phase medium was independently heated to 37.5° C. prior to mixing. This temperature was maintained for the duration of the experiment. The time taken for a clot to form corresponds to the time taken for the maximum phase change to be observed. This correlates to the rate of the coagulation reaction. Table 1 shows the correlation between heparin concentration and the times at which initial and maximum phase changes was observed in the magneto-optical response.

TABLE 1

| Heparin concentration (IU) | Time to initial phase change (sec) | Time to maximum phase change (sec) |
| --- | --- | --- |
| 0.0 | 16 | 25.5 |
| 0.2 | 16 | 28.5 |
| 0.3 | 23 | 57.5 |
| 0.5 | 38.5 | 124.5 |
| 0.7 | 56 | 240.5 |

Heparin was found to influence both the time at which an initial change in phase is observed as well as the time taken to achieve maximal phase response. Heparin acts as an anti-coagulant. A higher heparin concentration slows down the rate of the coagulation reaction, and therefore the time taken for a phase change to be measured increases. The present apparatus and method is suitable to determine changes in clotting time for concentrations of heparin of at least as low as 0.2 IU.

Various modifications would readily suggest themselves to the skilled reader. For example, instead of using an electromagnet device, an arrangement can be utilised in which one or more permanent magnets apply a magnetic field. The permanent magnet can be moved by a suitable mechanical arrangement, for example utilising one or more motors or actuators which are controlled by a controller thereby modulating the applied magnetic field. Rotation of the permanent magnet or magnets is possible.

The invention claimed is:

1. A method of detecting a pathogen-associated molecular pattern (PAMP) analyte by detecting a change of a state of a liquid comprising the steps of:

providing a liquid detection medium comprising a liquid and a biological reagent and having a plurality of anisotropic magnetic particles suspended therein;

introducing a sample which contains the PAMP analyte to the liquid detection medium;

applying a modulated magnetic field across at least a portion of the liquid detection medium, wherein the magnetic field induces an alignment of the magnetic particles;

introducing polarised electromagnetic radiation into the liquid detection medium;

detecting a variable which is modulated by the applied magnetic field, wherein the variable is associated with the interaction of the polarised electromagnetic radiation with the magnetic particles and wherein the PAMP analyte causes a change in the state of the liquid which causes a variation in the detected variable, and wherein the change of state of the liquid is a change that arises as a consequence of a biological process involving the PAMP analyte and the biological reagent; and correlating the variation in the detected variable with the presence of the PAMP analyte.

2. A method according to claim 1 in which the modulated magnetic field gives rise to a phase lag between the magnetic particles and the magnetic field, and the variation in the phase lag is correlated with the change in the state of the liquid.

3. A method according to claim 1 in which the variable has an amplitude, and the variation in the amplitude is correlated with the change in the state of the liquid.

4. A method according to claim 1 in which the state of the liquid detection medium that the analyte causes a change in is viscosity.

5. A method according to claim 1 in which the biological reagent comprises an amoebocyte lysate.

6. A method according to claim 1 in which the state of the liquid detection medium that the PAMP causes a change in is viscosity, and either a variation in an amplitude of the variable is correlated with the presence of the PAMP or the modulated magnetic field gives rise to a phase lag between the magnetic particles and the magnetic field, and the variation in the phase lag is correlated with the presence of the PAMP.

7. A method according to claim 1 in which the change in the state of the liquid is a change in the viscosity of the liquid.

8. A method according to claim 1 in which the magnetic particles comprise one or more of iron oxide, iron, cobalt, nickel, super-paramagnetic latex, magnetic polystyrene, and an alloy.

9. A method according to claim 1, in which the magnetic particles do not comprise a targeting material having an affinity for the PAMP analyte.

10. A method according to claim 1 in which the magnitude and/or the direction of the magnetic field is modulated.

11. A method according to claim 10 in which the direction of the magnetic field is rotated.

12. A method according to claim 1 in which the PAMP is a pyrogen or a β-glucan.

13. A method according to claim 12 in which the pyrogen is an endotoxin.

14. A method according to claim 1 in which the variable is a signal associated with electromagnetic radiation exiting the liquid detection medium.

15. A method according to claim 14 in which a transmission of electromagnetic radiation through the liquid medium is detected.

16. A method according to claim 14 in which localised plasmons are generated on the magnetic particles and the variable is enhanced by the generation of localised plasmons on the magnetic particles.

* * * * *